United States Patent [19]

Malhotra

[11] 4,008,625
[45] Feb. 22, 1977

[54] FLOATING NUT CONSTRUCTION

[75] Inventor: Surinder M. Malhotra, Georgetown, Conn.

[73] Assignee: Norco, Inc., Ridgefield, Conn.

[22] Filed: Dec. 15, 1975

[21] Appl. No.: 641,082

[52] U.S. Cl. .......................... 74/441; 74/424.8 A; 74/459; 74/465

[51] Int. Cl.² ................... F16H 55/18; F16H 1/18; F16H 55/22; F16H 55/06

[58] Field of Search ..... 74/441, 459, 465, 424.8 A, 74/424.8 R, 409

[56] References Cited

UNITED STATES PATENTS

| | | | |
|---|---|---|---|
| 3,124,969 | 3/1964 | Grabowski et al. | 74/459 X |
| 3,296,880 | 1/1967 | Maroth | 74/459 X |
| 3,393,577 | 7/1968 | Better | 74/424.8 A |
| 3,731,553 | 5/1973 | Nilsson | 74/424.8 A |
| 3,766,788 | 10/1973 | Metz | 74/441 |
| 3,766,800 | 10/1973 | Kennedy | 74/424.8 R |
| 3,802,290 | 4/1974 | Grove et al. | 74/459 |

*Primary Examiner*—Leonard H. Gerin
*Attorney, Agent, or Firm*—H. Gibner Lehmann; K. Gibner Lehmann

[57] ABSTRACT

A zero-backlash anti-friction nut construction for engagement with the threads of a screw. The device comprises a pair of nut sections having aligned through bores to receive the screw, pairs of rollers respectively carried by the sections and having generally conical tip portions engageable with the walls of the screw grooves, and bearings mounting each roller for rotation about its respective axis during such engagement. The rollers have Belleville springs urging them radially inward, and in addition, a coil spring carried by one of the sections biases the two toward one another against the action of the Belleville springs, so as to minimize looseness with the screw. The arrangement is such that the coil spring loads the nut sections sufficiently to effect slight retraction of each roller against the action of its Belleville springs. Improved performance and low backlash tracking of the nut sections along the screw thereby result.

9 Claims, 10 Drawing Figures

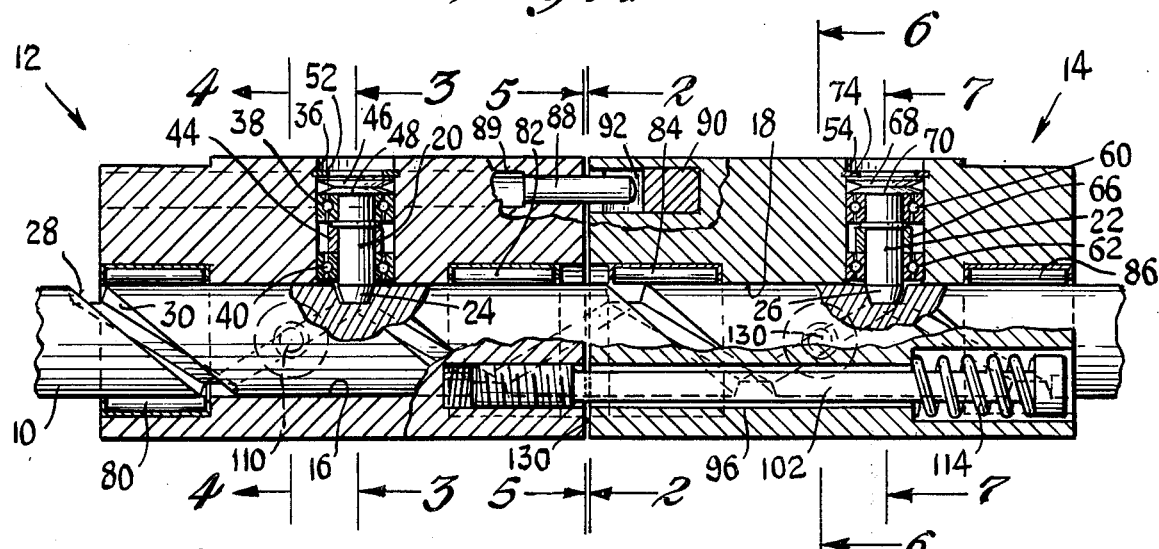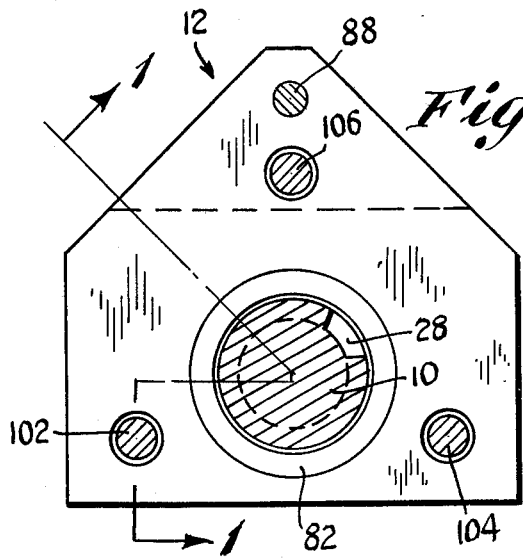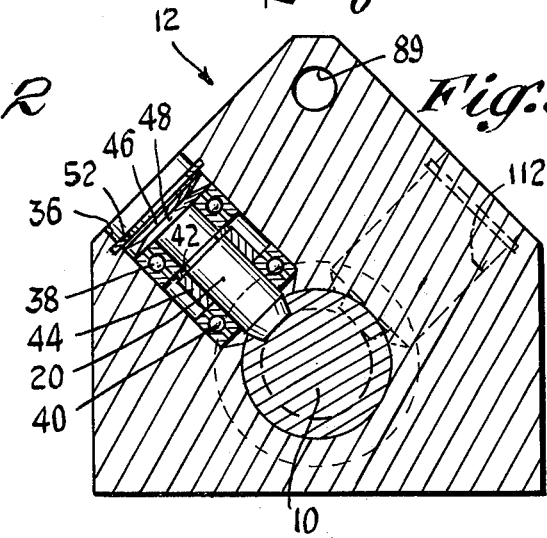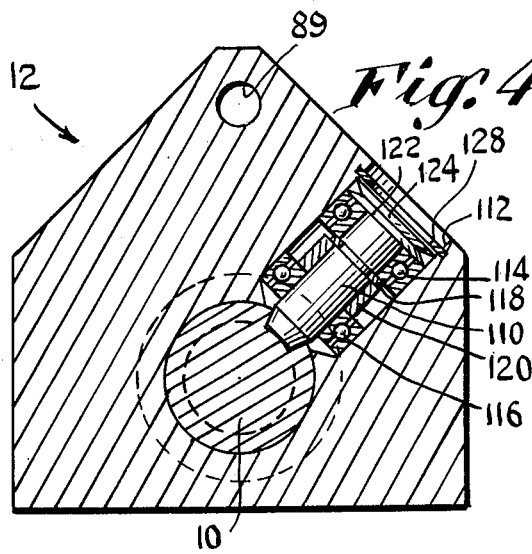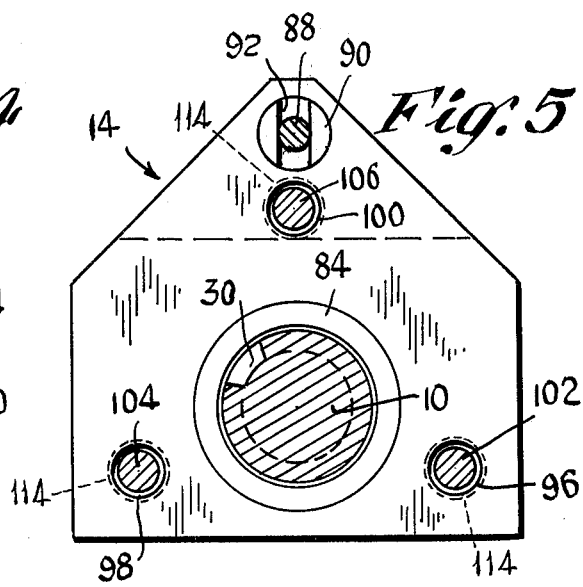

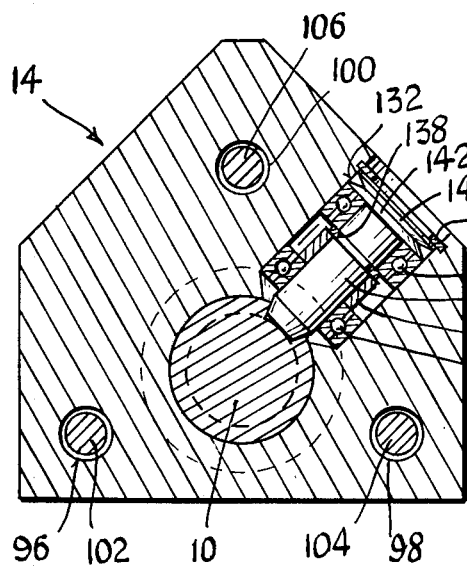
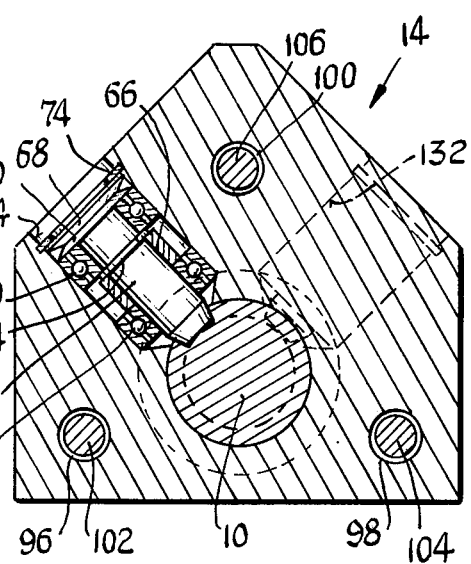
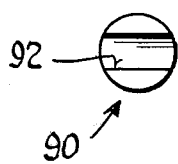 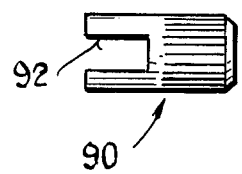 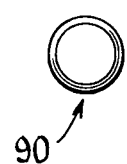

FLOATING NUT CONSTRUCTION

BACKGROUND

This invention relates generally to nut follower devices, and more particularly to nut constructions to reduce or minimize excessive looseness and backlash between a nut and the threads of a screw.

Prior anti-backlash nut constructions have employed a pair of aligned nut bodies disposed end to end which were connected by a spring that biased them in directions either toward or away from one another. By such an arrangement, the one nut body engaged the face on one side of the crest of the thread, with the other body engaging the opposite face of the crest, thereby tending to eliminate looseness between each body and the screw. Various arrangements were employed for retaining the nut bodies in end-to-end relation, such as by confining them in a yoke or housing, connecting them by springs, etc.

The main problems associated with the above constructions was that the efficiency between the screw and nut was low, and precise costly tolerances were required. The spring which biased the two nut bodies together tended to cause binding between each body and the screw, since it was the increased pressures between the latter and each nut body that were being relied upon to reduce the looseness and minimize backlash. Under such circumstances, there was a pronounced tendency for each body to rotate with the screw as the latter turned. Accordingly, special mountings had to be devised to prevent such turning, while still enabling smooth traversing movement of the bodies along the screw axis.

In addition, many of the prior art devices involved large surfaces which were in sliding engagement with one another. As a result there was excessive drag and wear over prolonged periods of use, this leading to erratic operation and consequent down time for effecting periodic maintenance.

SUMMARY

The above drawbacks and disadvantages of prior anti-backlash nut follower devices are obviated by the present invention which has for an object the provision of a novel and improved zero backlash nut construction which is both simple in construction and reliable in operation, and one which employs few separate parts.

A related object is the provision of a follower device as above characterized which is higher in efficiency and lower in cost than most prior units, due to virtual elimination of sliding friction between the various parts. As a result, excessive wear is eliminated, resulting in high performance and maintenance-free operation over prolonged periods of use. Still another object of the invention is the provision of a nut follower construction as set forth, employing two nut sections which are self-aligning, and which incorporate oppositely-acting pre-loading springs to accommodate slight variations in thread pitch between adjacent parts of the same screw, thereby eliminating costly tolerances, minimizing excessive looseness and providing high efficiency operation with virtually zero backlash.

The above objects are accomplished by a nut construction comprising first and second nut sections having aligned through bores to receive a screw, a pair of rollers carried respectively by the sections and having tip portions extending into the bores for engagement with the walls of the grooves in the screw, together with spring means associated with each roller for biasing it in a radially inward direction with respect to its own nut section. Biasing means are associated with the nut sections for urging them in axially opposed directions with respect to one another and tending to oppose the action of the spring means associated with each roller, wherein the biasing means and spring means cooperate to establish a pre-load condition between the nut sections, thereby minimizing looseness between the sections and the threads of the screw without requiring close tolerances. The rollers are freely turnable about their axes in suitable anti-friction bearing assemblages. In addition, bearing means on both sections are provided, for maintaining the bores of the nut sections substantially in axial alignment with one another and with the axis of the screw.

Other features and advantages will hereinafter appear.

In the drawings, illustrating a preferred embodiment of the invention;

FIG. 1 is an axial section of the zero-backlash anti-friction nut construction of the present invention, taken on line 1—1 of FIG. 2 set forth below, fragmentary portions being shown along another section for purposes of illustration.

FIG. 2 is a view taken on line 2—2 of FIG. 1

FIG. 3 is a vertical section taken on line 3—3 of FIG. 1.

FIG. 4 is a vertical section taken on line 4—4 of FIG. 1.

FIG. 5 is a view taken on line 5—5 of FIG. 1.

FIG. 6 is a vertical section taken on line 6—6 of FIG. 1.

FIG. 7 is a vertical section taken on line 7—7 of FIG. 1.

FIG. 8 is a front elevational view of a plug carried by one of the nut sections of FIG. 1, adapted to receive an alignment pin carried by the other of the nut sections of FIG. 1.

FIG. 9 is a right end elevational view of the plug of FIG. 8.

FIG. 10 is a rear elevational view of the plug of FIG. 8.

Referring to FIGS. 1–7 and in accordance with the present invention there is provided novel and improved low cost, zero-backlash nut construction for engagement with a screw 10, the nut construction comprising a pair of nut sections 12, 14 having through bores 16, 18 respectively adapted to receive the screw 10, and roller elements 20, 22, having conical tip portions 24, 26 respectively adapted to engage the walls 28, 30 of the groove in the screw 10. As shown particularly in FIG. 1, the roller 20 is carried in a radially extending recess 36 in the nut section 12, and is supported for rotation about its axis by means of ball bearings 38, 40. The roller 20 has a circumferential recess into which there is snapped a split ring 42 (FIG. 3). The latter bears against a spacer member 44 disposed between the bearings 38, 40. A pair of Belleville springs 46, 48 are disposed back-to-back and held in position by a retainer ring 52. The Belleville springs 46, 48 act through the bearing 38 and ring 42 to bias the roller 20 in a radially inward direction. Due to the fact that the tip 24 of the roller 20 is slightly conical, application of a load by the screw in a direction transverse to the axis of the roller will cause retracting movement thereof in a radially outward direction against the action of the Belleville washers. This retraction will be discussed further below.

Referring now to FIGS. 1 and 7, the other nut section 14 is seen to include a radially extending recess 54 in which the roller element 22 is disposed. The latter is carried on ball bearings 60, 62, and includes a shoulder in the form of a ring 64, (FIG. 7) which engages a spacer 66 disposed between the bearings 60, 62. A pair of back-to-back Belleville washers 68, 70 is held in position by a retainer ring 74. The tip of the roller 22 is adapted to engage one of the walls 28, 30 of the groove of the screw 10.

Referring again to FIG. 1, there are provided bearing means carried by each of the nut sections 12, 14 for maintaining them in axial alignment with one another, the bearing means comprising a pair of centralizing roller bearings 80, 82 respectively carried near the opposite ends of the nut section 12, and a similar pair of centralizer bearings 84, 86 disposed near the opposite ends of the nut section 14. The bearings engage the crests of the screw threads, and tend to prevent relative canting of the sections 12, 14 with respect to the screw axis.

The section 12 carries an alignment pin 88 preferably constituted of hardened steel, and which is received in a hollow plug 90 in the other nut section 14. The plug 90 is particularly illustrated in FIGS. 8–10, and is seen to include a slot 92 having a width slightly larger than the diameter of the alignment pin 88. The plug 90 is so positioned with the slot lying in a radial plane with respect to the nut section 14, such that the pin 88 can ride within limits up and down the slot 92. However, due to the fact that the width of the slot 92 is roughly the same as the diameter of the pin 88, there can occur no shifting of the latter with respect to the plug 90 in a direction perpendicular to the plane of the paper in FIG. 1. Such an arrangement has been found to be especially effective in preventing relative turning movement of the sections 12, 14, without interfering with the alignment provided by the roller bearings 80–86, or with the ability of the sections 12, 14 to move axially with respect to one another, as will be explained below. In the present instance, both the plug 90 and the pin 88 are pressed into their respective sections 14, 12. As elongate recess 89 in the section 12 enables access to the pin 88 during assembly, in order to effect its proper positioning. The outer surface of the plug has a ribbed configuration as shown in FIG. 9, which tightly engages the walls of the hole into which it is pressed.

In FIG. 1, the pin is shown in elevation, whereas the plug is illustrated in longitudinal section. While this figure has been taken mostly on the line 1—1 of FIG. 2, it will be understood that the showing of the pin and plug only is given for convenience of illustration, being through a fragmentary vertical section of FIG. 2.

Referring again to FIGS. 1, 6 and 7, the nut section 14 further includes additional longitudinal bores 96, 98 and 100 which are substantially parallel to the longitudinal bore 18. As shown in FIG. 2, the section 12 carries three cap screws 102, 104, 106 which extend into the bores 96–100 respectively. The latter are provided with shoulders against which there are seated three springs 114 respectively. Each spring 114 engages the head of its respective cap screw, and the shoulder of its respective bore. The arrangement is such that the springs 114 tend to draw the nut sections 12 and 14 together, thus making the conical tip 24 of the roller 20 engage one wall 30 of the groove in the screw 10, and the conical tip 26 of the roller 22 engage the opposite wall 28 of the thread groove. Such engagement of the opposite walls of the groove by the rollers 20, 22 is clearly shown in FIG. 1.

The nut sections 12 and 14 may optionally be provided with additional rollers as particularly shown in FIGS. 4 and 6. The section 12 is shown as including an additional roller 110 received in a radially extending recess 112 therein. In the appended claims, the roller 110 is referred to as a third roller, and is carried by the first nut section 12. Bearings 114, 116 are provided, and a ring 118 carried in a circumferential groove in the roller 110 bears against a space member 120. A pair of Belleville washers 122, 124 is disposed back-to-back and act against the roller 110 (through the ring 118 and bearing 114), so as to urge it in a radially inward direction. The outer Belleville washer 124 is held in place by a retainer ring 128.

As particularly illustrated in FIG. 6, the section 14 includes another roller, this being designated by the numeral 130. The latter is received in a radially extending recess 132 and is referred to in the appended claims as a fourth roller. It is carried on bearings 134, 136, includes a ring 138 and a spacer member 140. A pair of back-to-back Belleville washers 142, 144 biases the roller 130 (through the bearing 134 and the ring 138) in a radially inward direction. The assemblage is held in place by means of a retainer ring 148.

The operation of the improved zero-backlash nut of the present invention can now be readily understood by referring to FIGS. 1–7. In FIG. 3, the Belleville washer 48 contacts the outer race only of the bearing 38, with the inner race being pressed on to the roller 20. The spacer 44 and the inner race of the bearing 40 are similarly pressed on to the roller 20, such that the two inner races, the spacer 44 and ring 42 move as a unit. Sufficient clearance exists between the outer races of the bearings 38, 40 and the walls of the recess 36 to enable the unit to move radially inward under the action of the Belleville washers 46, 48, and to be sprung radially outward under the action of loads applied to the screw. The remaining rollers and mountings therefor are similar in construction.

The centralizer bearings 80–86 engage the crests of the thread, and thus maintain the nut sections 12, 14 in axial alignment with the screw 10. As shown in FIG. 1, there normally exists a small space 130 between the nut sections 12 and 14. This allows a limited amount of relative axial movement between the two. During normal operation, the rollers 20, 110 bear against the wall 30 of the groove in the screw. Similarly, the rollers 22, 130 bear against the oppositely facing wall 28 of the groove in the screw. This results from the action of the three springs 114 which bias the sections toward one another as shown in FIG. 1. The cap screws 102–106 are capable of limited manual adjustment with respect to the section 12, so as to enable variation in the force exerted by the three springs 114 on the two nut sections. In operation, the rollers 20, 110, 22 and 130 are retracted slightly from their fully advanced positions, against the action of the corresponding Belleville springs, due to the force of the compression springs 114. This enables slight advancing and retracting movement of each of the rollers during the traversal of the nut sections along the screw, in order to accommodate small variations in the thread pitch between adjacent areas thereof. Decreases in the pitch at a particular area on the thread of the screw can be accommodated for by radially inward movement of the rollers to thereby take up the excess slack. Simultaneously, the sections 12, 14 approach one another by a minute amount under the action of the springs 114. Similarly, an increase in the thread pitch can be accommodated for by radially outward movement of the rollers, thereby providing additional slack. Under such circumstances, the sections 12, 14 will be urged axially apart against the action of the springs 114, simultaneously with the retraction of the rollers.

During the initial adjustment, the cap screws 102–106 are drawn up sufficiently so that the springs 114 apply a pre-load to the nut sections 12, 14. Such a pre-load causes the rollers to retract slightly. This enables all rollers to undergo further retraction if required, or to become advanced, if this is required. As a result, excessive looseness between the nut sections and the screw, and consequent backlash are greatly reduced.

Assuming that the nut comprising the nut sections 12, 14 is non-rotating, and employed with a rotating screw, a suitable carriage or other device (not shown) can be fastened to either of the nut sections 12, 14 in order to hold the sections against rotation, and in addition to be driven thereby in an axial direction. Such an arrangement provides not only improved operation with respect to low-backlash, but in addition, provides good thread averaging, thus reducing or tending to reduce overall errors in the thread pitch between adjacent areas of the screw.

During relative axial movement of the sections 12, 14, the pin 88 slides axially in the slot 92. Since the length of the slot exceeds the pin diameter, a limited self-alignment capability is maintained as far as the axes of the two sections 12, 14 and that of the screw 10 are concerned. The pin 88 can move up and down with respect to the slot 92 in FIG. 5, but not sideways therein. Accordingly, the pin and slot constitute a floating driving connection which acts as a spline adapted to prevent relative turning while at the same time permitting limited transverse or trans-axial movements.

From the above it can be seen that I have provided a novel and improved high-efficiency, low-backlash nut construction, the device being simple in construction, reliable in operation, and virtually maintenance free. Low cost operation is achieved in that the number of moving parts is kept to an absolute minimum. Sliding movement between the surfaces contacting one another is greatly reduced by the use of rollers and the bearing devices carrying the same. The nut construction is thus seen to represent a distinct advance and improvement in the technology of nut follower devices.

Variations and modifications are possible without departing from the spirit of the invention.

I claim:

1. A zero-backlash anti-friction nut construction for engagement with the threads of a screw, comprising in combination:
    a. a first nut section having a through bore to receive the screw,
    b. a second nut section disposed end to end to the first section and having a through bore in axial alignment with the first bore,
    c. a roller carried by the first nut section, having a tip portion extending into the bore thereof for engagement with the walls of the grooves in the screw,
    d. anti-friction means mounting said roller on the nut section for rotation about its axis during such engagement,
    e. spring means biasing said roller in a generally radially inward direction with respect to the first nut section to thereby maintain such engagement,
    f. an additional roller, said additional roller being carried by the second nut section and having a tip portion extending into the bore thereof, for engagement with the walls of the grooves in the screw,
    g. anti-friction means mounting said additional roller on the second nut section for rotation about its axis during such engagement,
    h. spring means biasing said additional roller in a generally radially inward direction with respect to the second nut section,
    i. bearing means carried by said nut sections for maintaining their bores substantially in axial alignment with respect to one another, and with respect to the axis of the screw, and
    j. means carried by at least one of said sections, for biasing the sections in axial opposed directions with respect to one another and opposing the action of the spring means associated with said rollers, said section biasing and spring means cooperating to minimize looseness and slop in relative axial directions between each of the nut sections and the threads of the screw while at the same time said section biasing means enables the nut sections to float laterally to their axes with respect to each other,
    k. said bearing means comprising two pairs of end bearings,
    l. one pair of end bearings being disposed near opposite ends respectively of one nut section,
    m. the other pair of end bearings being disposed near opposite ends respectively of the other nut section, said bearing means preventing the lateral float movement of the nut sections as permitted by said section biasing means.

2. The invention as defined in claim 1, and further including:
    a. cooperable anchorage means on the nut sections, preventing relative turning therebetween while at the same time enabling the nut sections to have a limited relative lateral floating movement, said anchorage means comprising an alignment pin carried by one of said nut sections,
    b. the other of said nut sections having a slot to receive said pin, thereby restraining the two sections against relative rotation with respect to one another.

3. The invention as defined in claim 2, wherein:
    a. said slot extends radially with respect to the other section, to enable limited sliding movement of the pin and the first section with respect thereto.

4. The invention as defined in claim 2, and further including:
    a. a plug carried by said other nut section,
    b. said slot being disposed in said plug,
    c. said plug and pin being constituted of hardened steel to minimize wear.

5. The invention as defined in claim 2, wherein:
    a. said pin has a snug sliding fit in said slot, whereby excessive looseness between the pin and other nut section is minimized.

6. The invention as defined in claim 1, wherein:

a. said first nut section has a radially extending recess,
b. said first roller mounting means including a ball bearing receivable in said recess and having an inner race engaging the roller,
c. said first spring means comprising a Belleville washer disposed in said recess and biasing said roller in a radially inward direction.

7. The invention as defined in claim 1, wherein:
a. the tip portion of said first roller is substantially conical.

8. The invention as defined in claim 1, and further including:
a. a third roller,
b. said third roller being carried by said first nut section and having a tip portion extending into the bore thereof,
c. means mounting the third roller for rotation about its axis,
d. spring means biasing said third roller in a generally radially inward direction with respect to the first nut section,
e. a fourth roller,
f. said fourth roller being carried by said second nut section and having a tip portion extending into the bore thereof,
g. means mounting the fourth roller for rotation about its axis, and
h. spring means biasing said fourth roller in a generally radially inward direction with respect to the second nut section,
i. said nut section biasing means tending to oppose the action of the spring means acting on said third and fourth rollers, to thereby reduce looseness and slop between each of the nut sections and the threads of the screw.

9. The invention as defined in claim 1, wherein:
a. said biasing means for the nut sections comprises a coil spring, and
b. a cap screw carried by one of said sections,
c. the other of said sections having an additional bore substantially parallel to the first bore thereof,
d. said additional bore having a shoulder,
e. said spring engaging and being disposed between the head of said cap screw and said shoulder,
f. the diameter of said additional bore being substantially larger than the diameter of the cap screw, to allow for limited relative lateral movement of the latter with respect to the walls of said bore.

* * * * *